US006550250B2

(12) United States Patent
Mikkelsen et al.

(10) Patent No.: US 6,550,250 B2
(45) Date of Patent: Apr. 22, 2003

(54) PROCESS FOR THE REDUCTION OF SCR NO$_X$ EMISSIONS AND APPARATUS THEREFOR

(75) Inventors: Svend-Erik Mikkelsen, Værløse (DK); Per L. T. Gabrielsson, Helsingborg (SE)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 10/079,421

(22) Filed: Feb. 22, 2002

(65) Prior Publication Data
US 2002/0124568 A1 Sep. 12, 2002

(30) Foreign Application Priority Data
Mar. 2, 2001 (DK) ........................................ 2001 00345

(51) Int. Cl.[7] ................................................ F01B 31/16
(52) U.S. Cl. ............................ 60/685; 60/274; 60/286; 60/295; 60/303
(58) Field of Search .................... 60/685, 274, 286, 60/295, 303

(56) References Cited

U.S. PATENT DOCUMENTS

| 5,709,080 A | * | 1/1998 | Arora et al. | .......... | 60/274 |
| 5,845,487 A | * | 12/1998 | Fraenkle et al. | .......... | 60/274 |
| 6,041,594 A | * | 3/2000 | Brenner et al. | .......... | 90/309 |
| 6,063,350 A | | 5/2000 | Tarabulski et al. | | |
| 6,209,315 B1 | | 4/2001 | Weigl | | |
| 6,273,120 B1 | * | 8/2001 | Hofmann et al. | .......... | 137/98 |
| 6,427,439 B1 | * | 8/2002 | Xu et al. | .......... | 60/286 |

FOREIGN PATENT DOCUMENTS

| DE | 1172 910 | 6/1964 |
| DE | 198 19 579 | 9/1999 |
| EP | 0 953 739 A2 | 4/1999 |
| GB | 840259 | 7/1960 |
| JP | 2-207119 | 8/1990 |

* cited by examiner

Primary Examiner—Hoang Nguyen
(74) Attorney, Agent, or Firm—Dickstein Shapiro Morin & Oshinsky LLP

(57) ABSTRACT

The invention concerns a process and an apparatus for reducing the content of nitrogen oxides (NOx) in the exhaust gases of diesel engines or turbines for stationary or mobile applications/vehicles in an SCR system by providing a stored source of liquid reducing agent and feeding the stored reducing agent to the exhaust gases, said process comprising transferring the liquid reducing agent from the external storage tank to a membrane storage tank equipped with an inner bellow consisting of a non-permeable flexible membrane, and a hydraulic or pneumatic displacement fluid located outside the inner bellow, filling the flexible inner bellow with liquid reducing agent and transferring the liquid reducing agent from the flexible inner bellow to the exhaust gases.

10 Claims, 5 Drawing Sheets

PROCESS FOR THE REDUCTION OF SCR $NO_x$ EMISSIONS AND APPARATUS THEREFOR

BACKGROUND OF THE INVENTION

1. Field of the Invention

This invention relates to a process for the reduction of nitrogen oxide (NOx) emissions in the exhaust gases of diesel engines or turbines for stationary or mobile applications, and more particularly, to a process suitable for use in a Selective Catalytic Reduction (SCR) system.

The SCR system represents a known and widely spread technology for the removal of oxides of nitrogen in the exhaust gases from turbines, boilers, burners, power plants and other plants utilizing fossil fuels in the heavy industry. This system is based on the creation of a reducing atmosphere over a catalyst in the presence of the NOx compounds present in the exhaust gases.

The selection of a reducing agent depends on the local conditions prevailing in the different geographical areas where SCR systems are used. Conditions such as pricing, legislation and logistics play a role in the choice of the reducing agent. Reducing agents that are commonly used with diesel engines are neat or aqueous ammonia ($NH_3$), solid urea ($NH_2CONH_2$) or urea dissolved in water.

Anhydrous ammonia is, however, extremely hazardous, toxic and volatile. On exposure to air, at a sufficiently high temperature and pressure, anhydrous ammonia can combine with air to form a combination that can be lethal. These properties therefore result in problems with the safety aspects where the storage, transportation and handling of large quantities of ammonia are concerned. Urea as a non-toxic alternative to ammonia does not present the same extensive safety problems, and it can be converted to ammonia at a latter stage.

In the case of ammonia or urea, the reducing agent reacts with NOx compounds such as nitrogen oxide (NO) and nitrogen dioxide ($NO_2$), in the presence of a catalyst, and at normal exhaust gas temperatures of 250–450° C., to liberate free nitrogen ($N_2$) and water. The catalysts used are generally known as DENOX catalysts.

When the reducing agent is urea, it undergoes pyrolysis at approximately 275° C. into gaseous ammonia and cyanuric acid (HNCO) according to the following reaction:

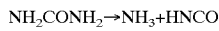

$$NH_2CONH_2 \rightarrow NH_3 + HNCO$$

The HNCO then reacts with the water in the exhaust gas as follows:

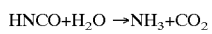

$$HNCO + H_2O \rightarrow NH_3 + CO_2$$

The $CO_2$ does not participate further in the DENOX reaction, whereas the ammonia molecules subsequently react with the nitrogen oxide, NO, on the surface of the catalyst according to the reaction:

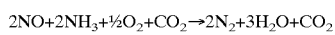

$$2NO + 2NH_3 + \tfrac{1}{2}O_2 + CO_2 \rightarrow 2N_2 + 3H_2O + CO_2$$

Storage and feeding systems for the selected reducing agent which are used in the various plants, vary in design and construction, but in general, most SCR systems are applied to stationary plants with good infrastructure. Consequently, access to electricity, heat, and sheltered surroundings provide solutions for the safe storage and operation of stationary systems.

Contrary to the above-mentioned stationary plants are mobile applications such as heavy-duty (HD) truck vehicles operated either on the road, or off road vehicles and equipment. The application of DENOX catalysts for SCR systems to be used in the automotive industry requires that several criteria are fulfilled. These criteria include high resistance to extreme climatic conditions such as subzero temperatures lower than the crystallization point of urea, which is –11° C.

Resistance to high temperature is also a requirement, since high temperature leads to the reducing agent exhibiting high vapour pressure, and this causes problems during refueling and venting of the vehicles. In addition, vehicle vibrations caused during driving also necessitate proper solutions in order to run the operations in a trouble-free manner.

Thus, there are current demands for high durability and stability when introducing these systems to the automotive industry.

2. Description of the Prior Art

There have been several attempts to reduce the emissions of NOx from diesel engines.

U.S. Pat. No. 6,063,350, which is incorporated herein by reference, discloses a method for SCR NOx emission reduction in an exhaust gas from a lean-burn engine using an aqueous solution of urea. In this system, temperature fluctuations and formation of solid deposits are avoided by monitoring the quality, temperature and level of the urea solution in a storage vessel, using a modular assembly of different sensors mounted inside the urea storage vessel. Based on the sensed parameters, sensor signals are generated compared to reference values, and the flow of urea solution is controlled in response to these signals. A heater can be used to maintain the temperature of the urea solution.

It also states that precipitation of solids is avoided by recirculating urea through a line between the storage vessel and the injector, which injects urea to the exhaust gases. The rate at which this recirculation takes place helps to maintain the temperature of the urea solution at a sufficiently low level, such that urea is not permitted sufficient time at elevated temperature to hydrolyze to the extent that solids are deposited.

U.S. Pat. No. 6,209,315 incorporated herein by reference, discloses a method and a device for controlled feeding of a reducing agent in an SCR process for reducing NOx in exhaust gas. The reducing agent is pumped from a storage container to a pressure accumulator inserted between the storage container and the metering valve to the SCR catalyst. The quantity of reducing agent metered may be evaluated from the displacement of a sprung (sprin-loaded) diaphragm in the pressure accumulator in association with a pressure sensor.

In all tank systems, various types of equipment can be used to avoid freezing of the urea solution. The freezing point of a 32.5 w/w % aqueous urea solution is –11° C. Insulation and various heaters supplied by the battery or other energy sources are mentioned in the prior art. These types of protective equipment are only effective provided a constant power source is available. Loss of battery power in cold weather will cause freezing and crystallization of the urea at sufficiently low temperatures. In ordinary tank systems, damage is seen as a result of the expansion during freezing. The tank and the contents of the tank such as sensors, pumps and other equipment installed inside may then be permanently damaged.

Several problems associated with the SCR systems currently in use for NOx reductions are corrosion of the different components in the system, crystallization of urea which leads to deposits in the lines, maintaining constant valve settings and unacceptable evaporative emissions. Sub-zero temperatures also cause freezing followed by destruction of the tank liner pumps. No known system has so far been able to run safely during all the different operating modes.

SUMMARY OF THE INVENTION

It is therefore an object of the invention to provide a safe, reliable SCR system for reducing NOx emissions from diesel systems.

It is another object of the invention to eliminate the crystallization problems leading to destruction of equipment, associated with freezing of a reducing agent such as urea.

It is yet another object of the invention to provide simple modular membrane equipment to be used in the SCR system.

It is yet another specific object of the invention to provide an SCR system in which any type of liquid reducing agent can be used.

It is yet another specific object of the invention to provide a gas as a pneumatic driving force behind the transfer of the reducing agent.

It is yet another specific object of the invention to provide a liquid as a hydraulic driving force behind the transfer of the reducing agent.

These objects are achieved by the present invention, which provides an improved process and a simple modular apparatus for SCR NOx reduction.

The invention described herein concerns a process for reducing the content of nitrogen oxides (NOx) in the exhaust gases of diesel engines or turbines for stationary or mobile applications/vehicles in an SCR system by providing a stored source of liquid reducing agent and a hydraulic or pneumatic displacement fluid, and feeding the stored reducing agent to the exhaust gases, said process comprising transferring the liquid reducing agent from the external storage tank to one or more membrane storage tanks, each equipped with an inner bellow consisting of a non-permeable flexible membrane, and a hydraulic or pneumatic displacement fluid located outside the inner bellow, filling up the flexible inner bellow with liquid reducing agent and simultaneously exerting pressure on the displacement fluid in the membrane storage tank until the feeding pressure is attained, increasing the pressure of the displacement fluid in the membrane storage tank by transferring more fluid into the volume present outside the flexible inner bellow, and thus forcing the liquid reducing agent to leave the flexible inner bellow, transferring the liquid reducing agent from the flexible inner bellow to the exhaust gases via a dosing valve and a mixing device.

The invention concerns also an apparatus for reducing the content of nitrogen oxides (NOx) in the exhaust gases of diesel engines or turbines for stationary or mobile applications/vehicles in an SCR system, by providing a stored source of liquid reducing agent and feeding the stored reducing agent to the exhaust gases in a process according to claim 1, the apparatus comprising an external storage tank for storing liquid reducing agent, one or more membrane storage tanks, each equipped with an inner bellow consisting of a non-permeable flexible membrane, being adapted to expand and contract with the aid of a hydraulic or pneumatic displacement fluid located outside the inner bellow, a compressing device for the regulation of flow of displacement fluid to and from the membrane storage tank, a dosing device for regulation of flow of reducing agent to the mixing device, a mixing device for mixing reducing agent with air.

The process according to the invention utilizes a tank system with a modular membrane unit, which is more beneficial compared to tank systems which do not have such a unit. The use of a gas such as air as a pneumatic force or a liquid as a hydraulic force, eliminates loss of reducing agent due to evaporation during refilling. Non-membrane systems have an equilibrium determined saturated vapour in the air above the reducing agent.

If urea is used, urea vapour results in urea crystals when the vapour is dried. Deposition of solid urea crystals in the valves, inlets and outlets of the system lead to malfunction of the equipment. When the membrane storage tank is used, the separation of the reducing agent from the air present ensures that no vapour from the reducing agent is present in the air part of the system. Thus, no problems associated with vapour in the air are observed.

If urea or ammonia is used as a reducing agent, tanks, valves and tubing etc. made of inexpensive brass components cannot be used as they corrode in the presence of these compounds. More expensive types of steel have to be used in the areas subjected to increased pressure. It is, however, not necessary to use steel components in the storage system used in the process according to the invention due to its unique construction and functioning.

Another advantage of the system used in the process according to the invention is that the membrane tank system is not destroyed if it is accidentally cooled down below the freezing point of the urea solution. The reason for this is that the flexible membrane, containing the reducing agent solution, always has the ability to cope with the expansion of the reducing agent. This ability is obtained by using a flexible material, which can expand and contract. Suitable materials are different types of rubber, for instance EPDM (ethylene propylene diene monomer) rubber. Other types can also be used, provided they are flexible by nature.

The inner side of the storage tank shell can be coated with foam rubber. A suitable layer a few millimeters in thickness has shown to be sufficient to absorb the small expansion of the flexible membrane caused by the freezing or crystallisation of urea. No permanent damage of the tank system can thus be induced, and when the temperature exceeds the freezing point of the reducing agent, causing the reducing agent to melt, then the functioning of all equipment is normalised. To avoid freezing, precautions similar to those used for non-membrane systems may be used for example heating.

DETAILED DESCRIPTION

The apparatus consists of an external tank (C) and a membrane storage tank (B) with an in-built inner bellow (A), the inner bellow (A) being constructed from a non-permeable flexible membrane (A1). A unit (H) for compressed air or any other gas to be used for pneumatic displacement, and a tank (T) for diesel oil or any other fluid to be used for hydraulic displacement, are also present.

In addition there is a 3-way valve (V1) for the entrance and exit of reducing agent to the membrane storage tank, another 3-way valve (V2) allowing the displacement fluid to enter or exit the membrane storage tank, and a number of pressure indicators and reduction valves. A dosing valve (G) for transferring the reducing agent to a mixing device (F) is also present. Finally the reducing agent enters the exhaust gas stream (E).

A suitable mixing device could be of the type having a combined silencing and mixing effect such as the device described in EP patent application No. 960,650, which is incorporated herein by reference.

The figures are explained using urea as an example of a reducing agent. Any other reducing agent could be used in place of urea.

Figure 1:
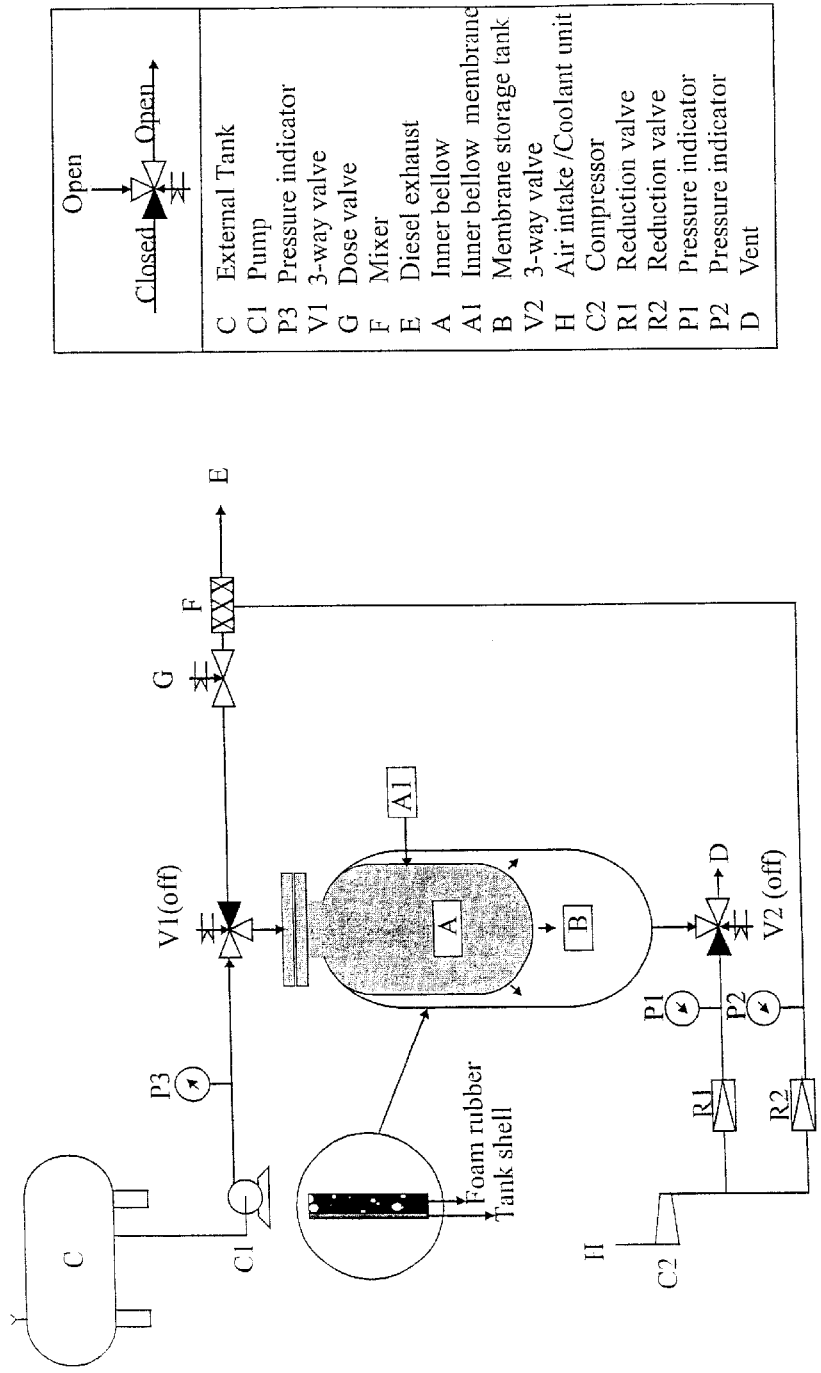
FIG. 1 is a flow diagram showing the operation of the SCR system using pressurized air or gas in the filling mode.

FIG. 1 shows the SCR system using pressurized air or any other gas in the filling mode. Arrows on the simplified flow sheet indicate the actual flow direction through the system. The external storage tank (C) contains liquid urea and urea vapour. Liquid urea from (C), which could be the tank station, is transferred to the local tank system (B), which could be on the vehicle by means of an external pump (C1). Transfer pressure is indicated on pressure indicator (P3). The 3-way valve (V1) in an "off" position enables urea to flow to the inner part of the membrane (A1). During fill up, air surrounding the membrane is compressed and passes through valve V2, which is also in "off" position, and is led to the surrounding atmosphere through the vent (D). Final fill up is seen when the pressure increases to the same level as the feed pressure from the pump (C1), indicated on pressure indicator (P3).

FIG. 1 also illustrates the placement of the rubber foam on the inner wall of the membrane storage tank (B). As mentioned earlier, the presence of this material prevents the potentially destructive expansion of the reducing agent, which can be caused by freezing or by heating.

Figure 2:
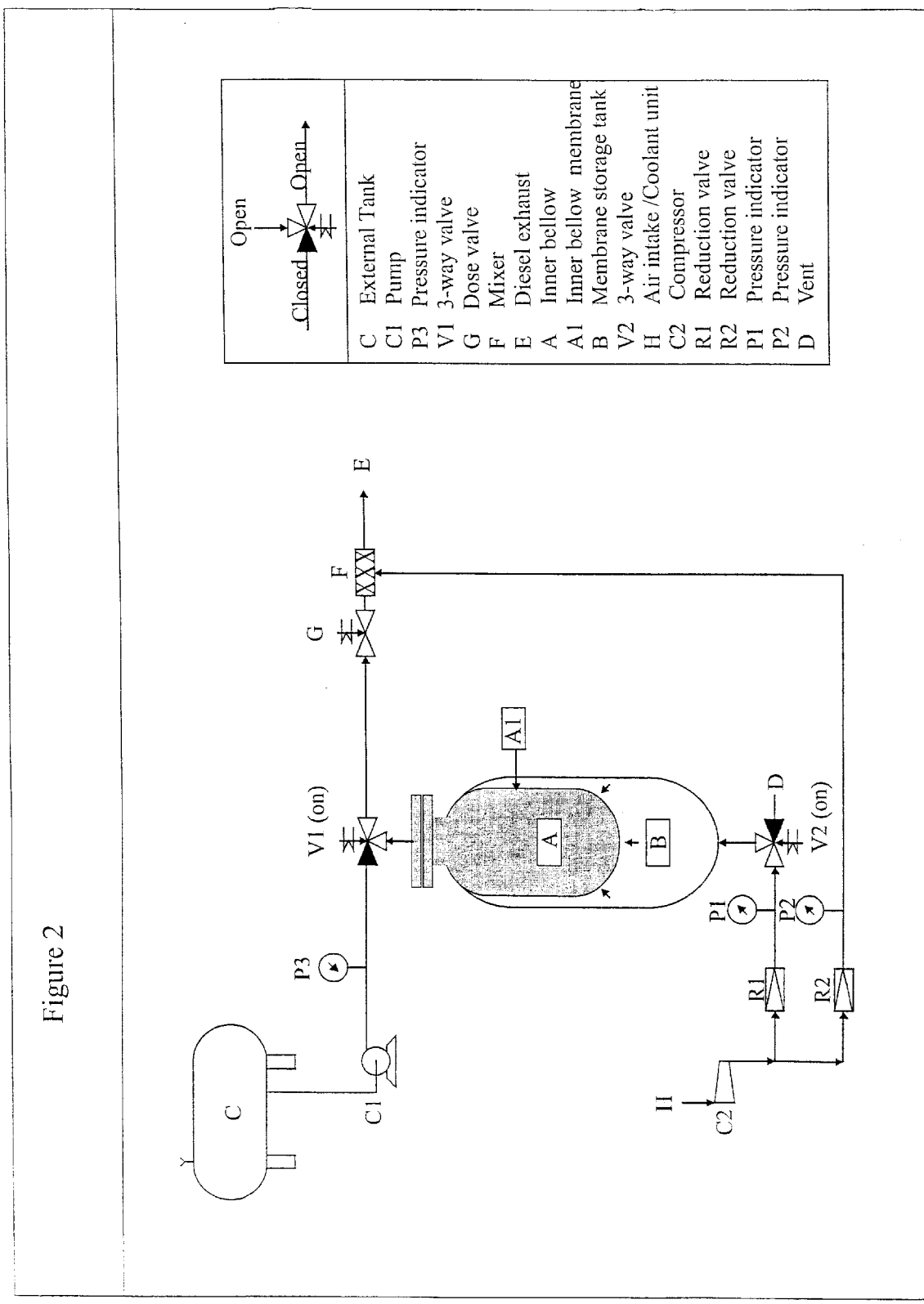
FIG. 2 shows the system of FIG. 1 using pressurized air or gas in the operation mode.

FIG. 2 shows the system of FIG. 1 using pressurized air in the operation mode. Arrows on the flow sheet indicate the actual flow direction. The two valves (V1) and (V2) have been turned to an 'on' position, thus reversing the flow direction of the urea. In this case, air or any other gas is compressed in the compressor (C2) and the compressed air flows through the two reduction valves (R1) and (R2). From (R1), the compressed air flows through valve (V2) into the membrane storage tank (B). On the reduction valve (R1) the pressure is set to for instance 2 bars ($2 \cdot 10^5$ Pa), and this is indicated on pressure indicator (P1). Urea in the inner bellow (A) is now forced to and through the valve (V1) to the dosing valve (G). (G) is electrically operated and the selected urea mass flow is determined by the conditions at this valve. Urea is then sent to the mixer (F). At this point, urea is mixed with air delivered from the reduction valve (R2).

This results in a homogeneous controlled mixture being delivered to the exhaust gas (E). Pressure is regulated to, for instance, 1 bar ($1 \cdot 10^5$ Pa), as shown on the pressure indicator (P2). The final urea/air mixture is now ready to be delivered to the exhaust gas (E).

Figure 3:
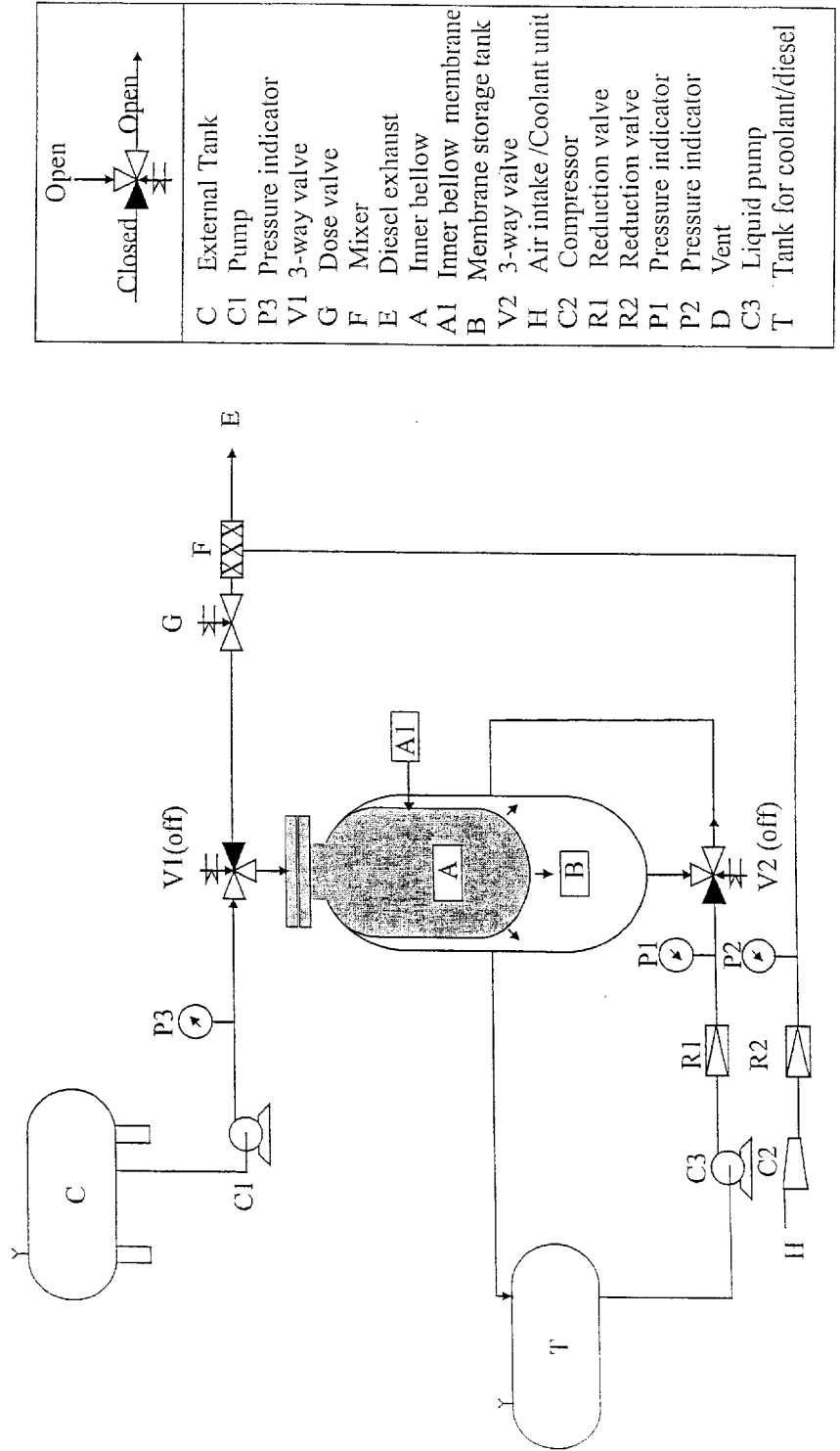
FIG. 3 shows the operation of the SCR system using pressurized liquid in the filling mode.

FIG. 3 shows another embodiment of the invention, where the system is operated in the filling mode using a pressurized liquid as a hydraulic displacement fluid, available on the existing systems in the engine or vehicle. The tank (T) can contain either an engine coolant such as water or hydraulic oil, diesel oil, or any other hydraulic displacement fluid. In fill mode the liquid is returned from the membrane tank (B) back to tank (T). Other operation parameters are equivalent to the description given for FIG. 1.

Figure 4:
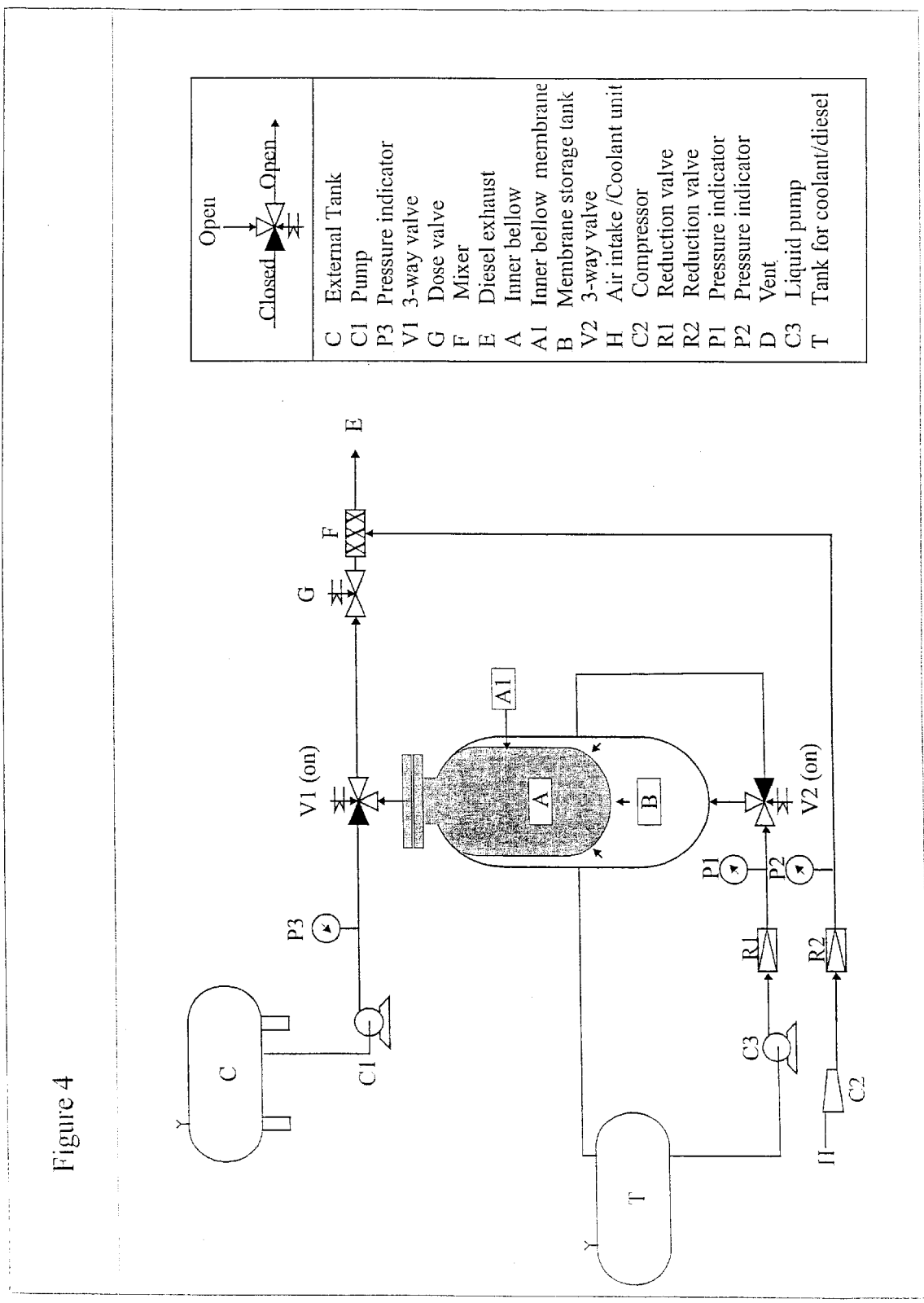
FIG. 4 shows the system of FIG. 3 using pressurized liquid in the operation mode.

FIG. 4 shows the system of FIG. 3 in operating mode. Liquid from the tank (T) is pumped by the pump (C3) to pressure regulator (R1), where the desired pressure is adjusted. The actual pressure is seen on the pressure indicator (P1). The liquid passes through the valve (V2) and enters the membrane storage tank (B), causing the reducing agent to leave the inner bellow (A) for the dosing valve (G).

Other operation parameters are equivalent to the description given for FIG. 2.

Figure 5:
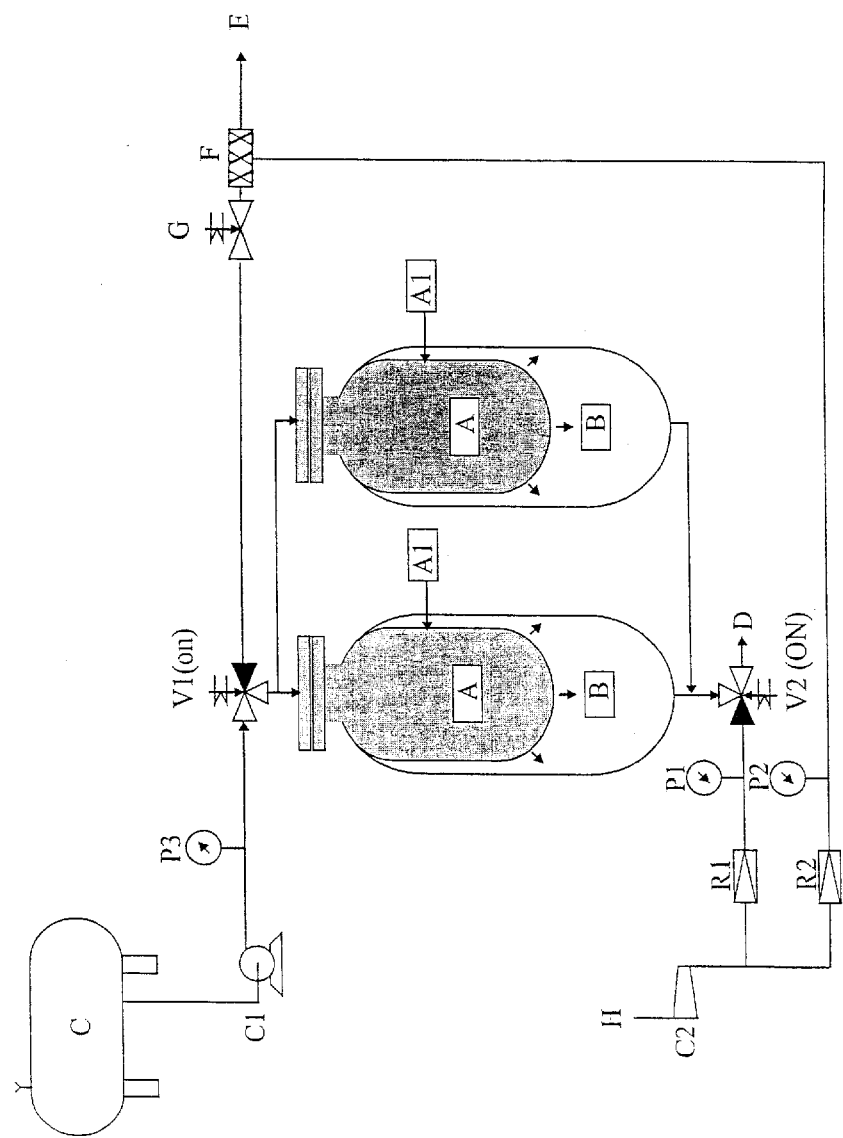
FIG. 5 shows a system with increased tank capacity.

FIG. 5 shows another embodiment of the invention, where the urea capacity or volume can be doubled or tripled by simply adding additional tanks in series to the system as shown.

With reference to the above, it can be seen that air is eliminated from the system, once the reducing agent is withdrawn from the tank (C), thus increasing the safety aspects of the apparatus.

It is also obvious that any gas or liquid can be employed as a pneumatic or hydraulic displacement medium for the movement of the reducing agent in and out of the inner bellow (A).

Displacement media used in this invention include fluids that are available at the actual location where the apparatus is being used. These fluids include gases such as air, carbon dioxide and nitrogen, and liquids such as diesel oil, cooling liquids and hydraulic fluids. Any other gases and liquids can also be used.

EXAMPLES

In the following examples a tank (B) equipped with an inner bellow (A) made of a flexible EPDM rubber membrane (A1) was tested.

The reducing agent as used in the following examples covers mixtures of urea or ammonia in water at any given concentration. However, any other reducing agent in any given concentration in water, or any of the above-mentioned liquids either in combinations with each other or neat, can be used. Typical use is 32½ w/w % urea in water or 25 w/w % ammonia in water.

Example 1

A system as described above was built and tested. The inner bellow (A) was filled with 32.5 w/w % aqueous urea solution. The valves (V1) and (V2) were switched to an 'on' position (operation mode). The pressure regulator (R1) was adjusted to 2 bar ($2 \cdot 10^5$ Pa). Carrier air to the mixer (F) was adjusted to 1 bar ($1 \cdot 10^5$ Pa) on reduction valve (R2). The dosing valve (G) was actuated and constant urea flow to exhaust gas (E) was established.

Example 2

Instead of urea solution, the inner bellow (A) was filled with 25% aqueous ammonia. Pressure settings were identical to those of Example 1. The dosing valve (G) was actuated and constant ammonia flow was established.

Example 3

As in Example 1, but in this case coolant liquid from tank (T) was used instead of compressed air. Coolant was pumped via the pump (C3). The stream pressure was adjusted on reduction valve (R1) to 2 bar ($2\cdot10^5$ Pa) as shown on the pressure indicator (P1). The liquid flow was sent through (V2), which was in an "on" position to tank (B). Urea contained in the inner bellow (A) was pressurized to the equivalent pressure of 2 bar ($2\cdot10^5$ Pa). Urea flow to the mixer (F) was established as in Example 1.

Example 4

As in Example 3, but using diesel oil instead of coolant in tank (T). Flow was established as in the previous Example.

Example 5

As in Example 3, but using hydraulic oil instead of coolant in tank (T). Flow was also established.

Example 6

The system was filled with 32.5 w/w % aqueous urea and then emptied using pressurized air at 2 bars ($2\cdot10^5$ Pa) in cycles repeated 1000 times. The filling time was 5 minutes, the hold time was 1 minute, and emptying time was 7 minutes. No malfunction of the system was observed under these strenuous conditions. Neither were there any visible signs of urea depositions.

Example 7

32.5 w/w % urea crystallizes at −11° C. In order to determine the membrane storage tank's resistance to extremely cold conditions, the inner bellow (A) of the storage tank (B) was filled with 32.5 w/w % aqueous urea and put into a freezer for 16 hours at −20° C. A temperature indicator was placed inside the membrane in the urea solution. After 16 hours, this indicator showed −19° C. The storage tank was then placed at ambient temperature for one day. The inner bellow (A) was emptied, separated from the tank and visually inspected. No damage to the inner bellow was observed.

What is claimed is:

1. A process for reducing the content of nitrogen oxides (NOx) in the exhaust gases of diesel engines or turbines for stationary or mobile applications/vehicles in an SCR system by providing a stored source of liquid reducing agent and feeding the stored reducing agent to the exhaust gases, said process comprising:

transferring the liquid reducing agent from the external storage tank to one or more membrane storage tanks, each equipped with an inner bellow consisting of a non-permeable flexible membrane with a hydraulic or pneumatic displacement fluid located outside the inner bellow, wherein the shell of each membrane storage tank is lined on its inner side with foam rubber at least in the area of the flexible membrane to absorb any expansion of the flexible membrane caused by freezing of the liquid reducing agent contained within the flexible inner bellow;

filling the flexible inner bellow with the liquid reducing agent and simultaneously exerting pressure on the displacement fluid in the membrane storage tank until the feeding pressure is attained;

increasing the pressure of the displacement fluid in the membrane storage tank by transferring more fluid into the volume present outside the flexible inner bellow, and thus forcing the liquid reducing agent to leave the flexible inner bellow; and transferring the liquid reducing agent from the flexible inner bellow to the exhaust gases.

2. A process as specified in claim 1, wherein the fluid used for the pneumatic or hydraulic displacement of the liquid reducing agent present in the flexible inner tank is a gas or a liquid, respectively.

3. A process as specified in claim 1, wherein the fluid used for the pneumatic displacement of the liquid reducing agent in the flexible inner tank is compressed air.

4. A process as specified in claim 1, wherein the fluid used for the hydraulic displacement of the liquid reducing agent in the flexible inner tank is cooling liquid.

5. A process as specified in claim 1, wherein the fluid used for the hydraulic displacement of the liquid reducing agent in the flexible inner tank is diesel oil.

6. A process as specified in claim 1, wherein at least two membrane storage tanks in series are available for storage of the liquid reducing agent.

7. A process as specified in claim 1, wherein the liquid reducing agent is aqueous urea or ammonia.

8. An apparatus for reducing the content of nitrogen oxides (NOx) in the exhaust gases of diesel engines or turbines for stationary or mobile applications/vehicles in an SCR system, by providing a stored source of liquid reducing agent and feeding the stored reducing agent to the exhaust gases, the apparatus comprising:

one or more membrane storage tanks, each equipped with an inner bellow for containing the liquid reducing agent, the inner bellow consisting of a non-permeable flexible membrane adapted to expand and contract with the aid of a hydraulic or pneumatic displacement fluid located outside the inner bellow, wherein the shell of the one or more membrane storage tanks is lined on its inner side with foam rubber at least in the area of the flexible membrane to absorb any expansion of the flexible membrane caused by freezing of the liquid reducing agent contained in the inner bellow;

a compressing device for the regulation of flow of the displacement fluid to and from the membrane storage tank;

a dosing device for regulation of flow of the reducing agent; and a mixing device for mixing the reducing agent with air.

9. An apparatus as specified in claim 8, wherein the membrane storage tank is built into the diesel tank of the engine.

10. An apparatus as specified in claim 8, wherein the membrane storage tank is built into the cooling system of the engine.

* * * * *